US006988830B2

(12) United States Patent
Maasch et al.

(10) Patent No.: US 6,988,830 B2
(45) Date of Patent: Jan. 24, 2006

(54) SPHERICAL PLAIN BEARING

(75) Inventors: Dirk Maasch, Steinhagen (DE); Harald Hochmuth, Hagenbuchach (DE); Jorg Wagner, Oberreichenbach (DE)

(73) Assignee: INA-Schaeffler KG, (DE)

( * ) Notice: Subject to any disclaimer, the term of this patent is extended or adjusted under 35 U.S.C. 154(b) by 0 days.

(21) Appl. No.: 11/103,415

(22) Filed: Apr. 11, 2005

(65) Prior Publication Data

US 2005/0196083 A1 Sep. 8, 2005

Related U.S. Application Data

(63) Continuation of application No. PCT/EP03/11464, filed on Oct. 16, 2003.

(30) Foreign Application Priority Data

Oct. 26, 2002 (DE) ................................ 102 49 969

(51) Int. Cl.
*F16C 11/06* (2006.01)

(52) U.S. Cl. ....................................... 384/206; 384/210

(58) Field of Classification Search ................ 384/192, 384/206–210, 495, 498

See application file for complete search history.

(56) References Cited

U.S. PATENT DOCUMENTS

| | | | | |
|---|---|---|---|---|
| 3,604,088 A | | 9/1971 | Turner | |
| 4,094,559 A | * | 6/1978 | Slusarski | 384/498 |
| 4,848,934 A | * | 7/1989 | Blakely et al. | 384/206 |
| 5,265,965 A | | 11/1993 | Harris et al. | |
| 5,328,273 A | * | 7/1994 | Nonaka et al. | 384/206 |

FOREIGN PATENT DOCUMENTS

| | | | |
|---|---|---|---|
| DE | 1 450 025 | | 4/1969 |
| DE | 1 903 422 | | 8/1970 |
| DE | 42 22 803 A1 | | 1/1993 |
| FR | 1 077 585 A | | 11/1954 |
| JP | 60073117 A | * | 4/1985 |
| WO | WO 89/02542 | | 3/1989 |
| WO | WO 03/069174 | | 8/2003 |

* cited by examiner

*Primary Examiner*—Thomas R. Hannon
(74) *Attorney, Agent, or Firm*—Charles A. Muserlian

(57) ABSTRACT

In a spherical plain bearing comprising an inner ring (2) configured as a spherical body comprising a through-bore, which inner ring (2) is mounted in an outer ring (1) through a slide bushing (3) that surrounds the inner ring (2), the outer ring (1) comprising a spherical inner surface and two diametrically opposite insertion grooves (4) that start from an end face of the outer ring (1) and enable the insertion of the inner ring (2), the slide bushing (3) is slipped onto the inner ring (2) prior to insertion of the inner ring (2) into the outer ring (1) and then shaped without chip removal, so that the slide bushing (3) comes to bear against the spherical outer surface of the inner ring.

4 Claims, 2 Drawing Sheets

SPHERICAL PLAIN BEARING

This application is a continuation of PCT/EP2003/011464 FILED Oct. 16, 2003.

FIELD OF THE INVENTION

The invention concerns a spherical plain bearing comprising an inner ring configured as a spherical body comprising a through-bore, which inner ring is mounted in an outer ring through a slide bushing that surrounds the inner ring, said outer ring comprising a spherical inner surface and two diametrically opposite insertion grooves that start from an end face of the outer ring and enable insertion of the inner ring.

BACKGROUND OF THE INVENTION

In spherical plain bearings in which the spherical shape in the outer ring and the spherical shape on the slide bushing is made by shaping through axial upsetting of the outer ring, a high degree of deformation in the inner region of the outer ring can lead to cracking. Spherical plain bearings with an inner ring mounted for tilting in the outer ring are often not maintenance-free and therefore require regular re-lubrication.

A spherical plain bearing of the pre-cited type is known from the published patent application DE 1 903 422. The outer ring of this bearing is made up of three separate parts, viz. two flat disks that are connected to each other through an intermediate ring, for instance by welding or gluing. The diameter of the intermediate ring is larger than the diameter of the spherical body that constitutes the inner ring. After the insertion of the spherical body into the outer ring, the intermediate space between the spherical body and the intermediate ring is filled with a plastic so as to form a slide bushing. However, already due to the plurality of components of the outer ring, the fabrication of this spherical plain bearing is very complex.

OBJECTS OF THE INVENTION

It is an object of the invention to provide a simple and reliable means for making a spherical plain bearing comprising an additional sliding bearing lining.

This and other objects and advantages of the invention will become obvious from the following detailed description.

SUMMARY OF THE INVENTION

The invention achieves the above objects by the fact that, prior to the insertion of the inner ring into the outer ring, the slide bushing is slipped onto the inner ring and then shaped without chip removal, so that the slide bushing comes to bear against a spherical outer surface of the inner ring. In this way, crack formation on the outer ring due to axial upsetting is avoided and a maintenance-free spherical plain bearing is created that permits any desired outer contour, for example, a double or a triple flange contour.

The slide bushing can be made to bear against the spherical inner ring by roller-burnishing or pressing.

Stampings extending into regions of the insertion grooves of the outer ring can be made on the slide bushing to prevent it from rotating. The outer ring can be made of a sintered steel.

The invention will now be described more closely with reference to the appended drawing that shows one example of embodiment.

DETAILED DESCRIPTION OF THE DRAWING

A spherical plain bearing of the invention comprises an outer ring 1, an inner ring 2 and a slide bushing 3. The outer surface of the inner ring 2 is spherical in shape. Corresponding to this, the inner surface of the outer ring 1 has the shape of a spherical shell. The slide bushing 3 is slipped onto the inner ring 2 and brought to bear against the inner ring 2 by shaping without chip removal. In order to be able to insert this assembled unit made up of the inner ring 2 and the slide bushing 3 into the outer ring 1, two diametrically opposite insertion grooves 4 are arranged on the outer ring 1 starting from one of its end faces.

Figure 1:
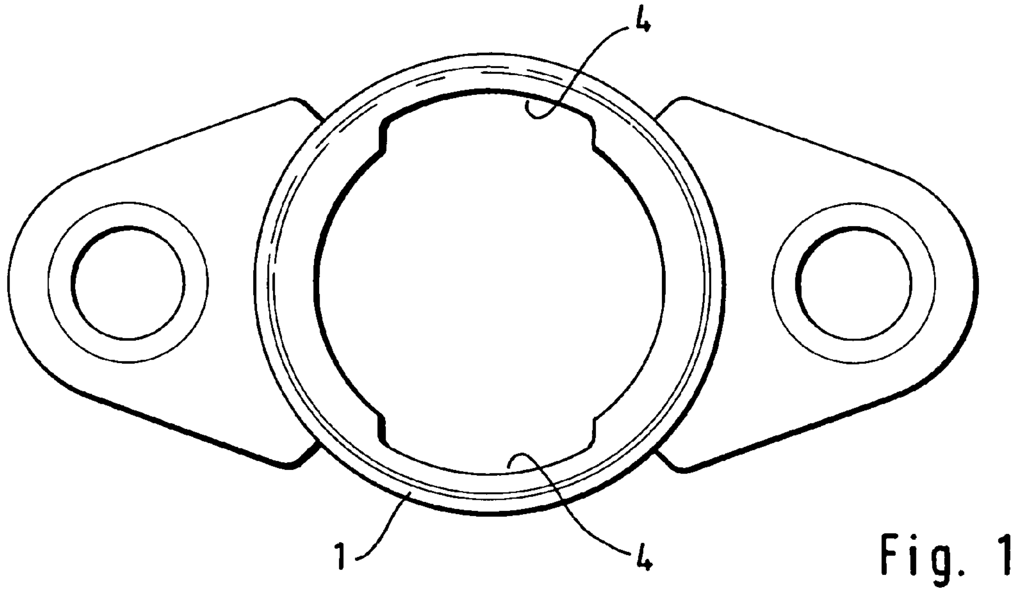
FIG. 1 shows an outer ring of a bearing of the invention.
Figure 2:
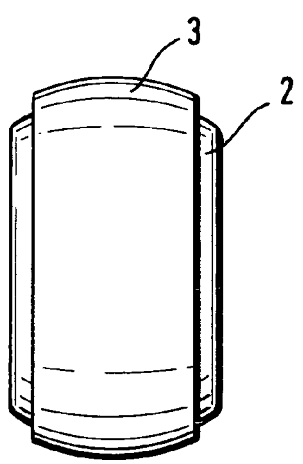
FIG. 2 shows an inner ring of the bearing of the invention, with a slide bushing slipped onto the inner ring.
Figure 3:
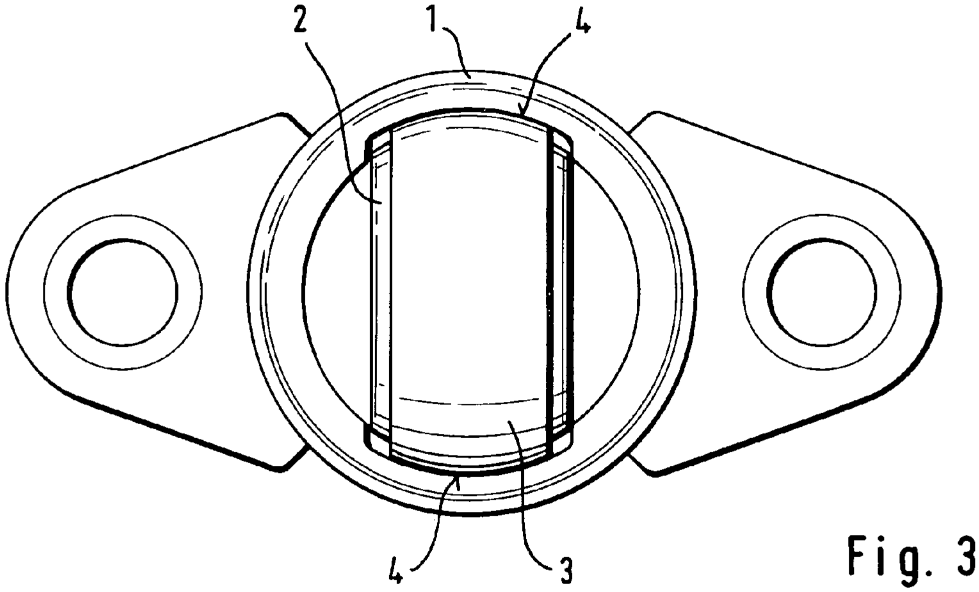
FIG. 3 shows the bearing of the invention, with the inner ring inserted but not yet pivoted.
Figure 4:
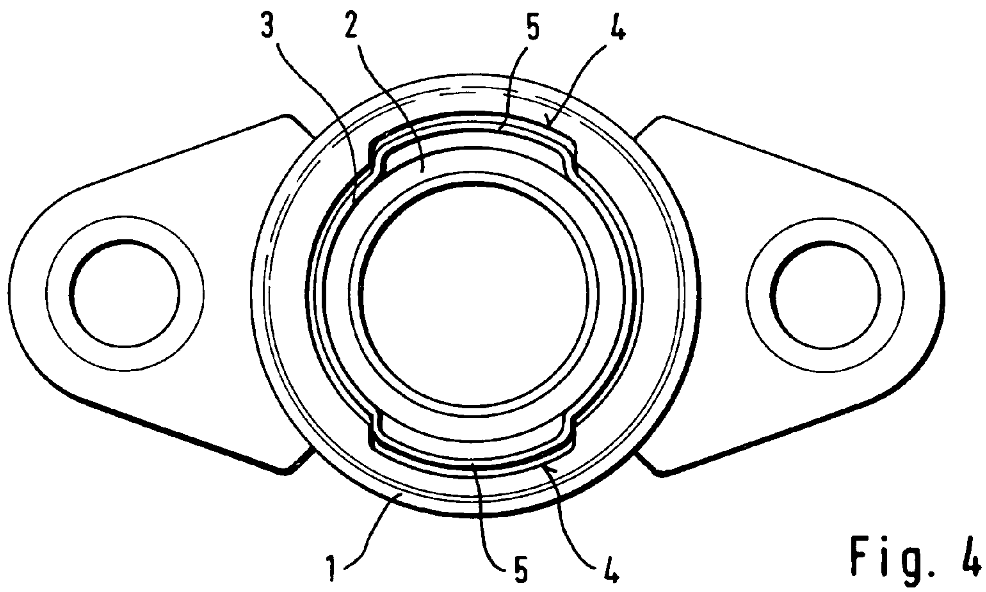
FIG. 4 shows the ready-assembled bearing of the invention.

As shown in FIG. 3, the slide bushing 3 and the inner ring 2 are inserted at first with a part of the periphery foremost into the outer ring 1 in the axial direction of the outer ring 1 and then pivoted through 90°, so that the outer ring 1, the slide bushing 3 and the inner ring 2 get arranged coaxially. Following this, the slide bushing 3 is deformed, so that stamped portions 5 that project into the two insertion grooves 4 of the outer ring 1 are formed on the slide bushing 3 and prevent a rotation of the slide bushing 3 relative to the outer ring 1. The inner ring 2 is thus mounted through the slide bushing 3 for rotation in the outer ring 1 and can pivot within limits in keeping with its spherical shape.

What is claimed is:

1. A spherical plain bearing comprising an inner ring configured as a spherical body comprising a through-bore, which inner ring is mounted in an outer ring through a slide bushing that surrounds the inner ring, said outer ring comprising a spherical inner surface and two diametrically opposite insertion grooves that start from an end face of the outer ring and enable insertion of the inner ring, the slide bushing being slipped onto the inner ring prior to the insertion of the inner ring into the outer ring and then shaped without chip removal, so that the slide bushing comes to bear against a spherical outer surface of the inner ring, stampings extending into regions of the insertion grooves of the outer ring being made on the slide bushing to prevent the slide bushing from rotating.

2. A bearing of claim 1, wherein the slide bushing is brought to bear against the spherical inner ring by roller burnishing.

3. A bearing of claim 1, wherein the slide bushing is brought to bear against the spherical inner ring by pressing.

4. A bearing of claim 1, wherein the outer ring is made of a sintered steel.

* * * * *